June 18, 1935. J. T. DUARTE 2,005,535
THEFT RESISTING HUB CAP AND WHEEL LOCK
Filed Feb. 9, 1935
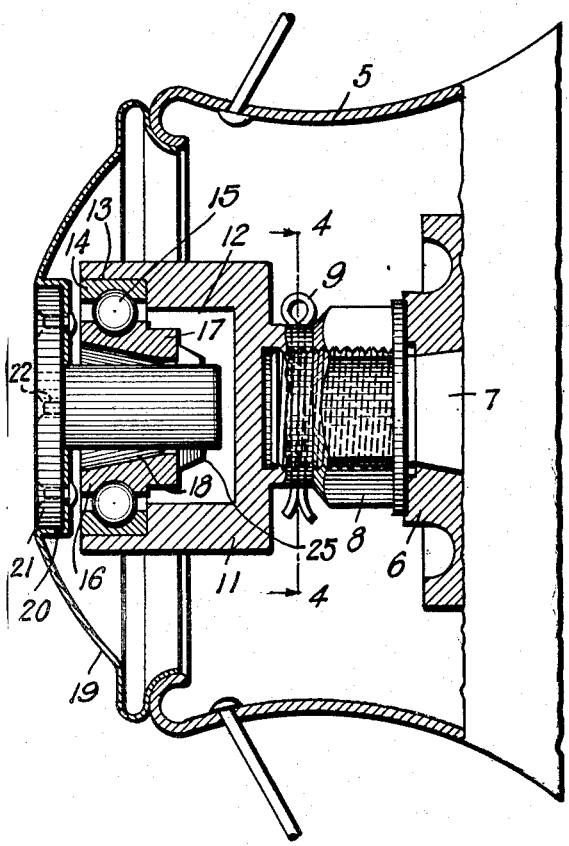
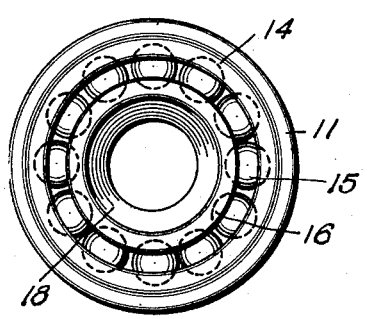
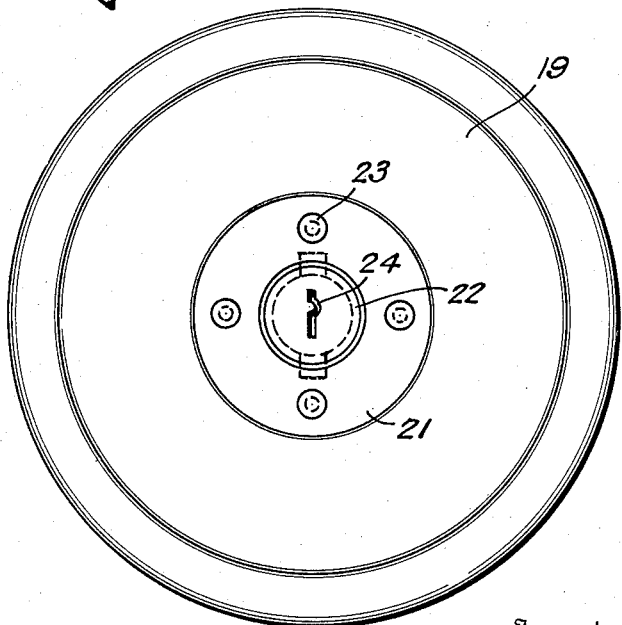
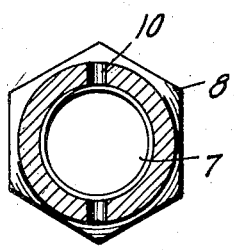
Inventor
John T. Duarte Patented June 18, 1935

2,005,535

UNITED STATES PATENT OFFICE 2,005,535

THEFT RESISTING HUB CAP AND WHEEL LOCK

John T. Duarte, Honolulu, Territory of Hawaii

Application February 9, 1935, Serial No. 5,770

2 Claims. (Cl. 70—90)

My invention relates to locks for demountable wheels and more particularly to key controlled means for locking demountable wheels upon the ends of their axles or other support.

It is an object of the invention to provide locking mechanism carried by the hub cap which is controlled by a key for securing the wheel upon the end of the axle to prevent unauthorized removal of the same.

A further object of the invention is to provide a hub cap locking mechanism which is mounted in the hub of the wheel so as to revolve therewith.

Another object of the invention is to provide a device of the above-mentioned character which is simple and durable in construction, reliable and efficient in operation and inexpensive to manufacture.

Other objects and advantages of the invention will be apparent during the course of the following description.

In the accompanying drawing, forming a part of this specification and in which like numerals are employed to designate like parts throughout the same, Fig. 1 is a section longitudinally of the wheel hub, Fig. 2 is a front view, Fig. 3 is an end view of the axle with the hub cap removed, and, Fig. 4 is a cross section taken on line 4—4 of Fig. 1.

In the drawing, wherein for the purpose of illustration, I have shown a preferred embodiment of my invention, the numeral 5 denotes a wheel hub shell of the usual construction having a hub 6 which is rotatably mounted on the axle shaft 7. The projecting end of the shaft 7 is screwthreaded and a nut 8 is screwed thereto on and fixedly secured thereto by means of a cotter pin 9 passing through openings 10 in the sides of the nut adapted to register with a transverse opening through the shaft. An enlarged head 11 is formed integral with the outer face of the nut 8 and has a central recess or chamber 12 formed in its outer end. The wall of the chamber, adjacent its periphery is provided with an annular recess 13 in which is fixed the outer race 14 of a ball bearing which consists of the usual balls 15 disposed between the outer race 14 and inner race 16. The inner race 16 projects within the chamber, as at 17, and the opening 18 therethrough is conical shape, tapering towards the inner end.

A hub cap 19 is adapted to fit over the open end of the hub shell 5 and is countersunk in the center, as at 20, to receive the face plate 21 of the lock barrel 22 which is secured to the hub cap by rivets 23. The lock barrel 22 is of an old and well known construction and extends axially through the opening 18 of the ball bearing, projecting slightly beyond the inner end of the inner race 16. The outer end of the lock barrel is provided with the usual slot 24 to receive a key for operating the lock. The inner end of the lock barrel has opposed laterally extending and movable lugs 25, which are controlled by the lock mechanism to move inwardly and outwardly from the lock barrel. When the lugs are extended they engage over the edge of the inner end of the inner race 16 of the ball bearing, securely fastening the hub cap to the bearing preventing unauthorized removal of the hub cap.

In use, the conventional demountable wheel may be easily equipped with the locking means, by substituting the nut 8 with the enlarged head 11 for the ordinary wheel locking nut and applying the hub cap 19 with the lock barrel 22. When the hub cap is applied the lock barrel projects through the opening 18 of the ball bearing and is locked in place by inserting the key in the slot 24 and turning the lock mechanism to project the lugs 25 over the edge of the inner end of the inner race 16 of the ball bearing. The inner race 16 is free to revolve within the chamber 12, so that the lock barrel turns with the hub cap and wheel.

It is to be understood that the form of my invention herewith shown and described is to be taken as a preferred example of the same and that certain changes in the shape, size and arrangement of the parts may be made without departing from the spirit of the invention or the scope of the subjoined claims.

Having thus described my invention, I claim:—

1. The combination with a wheel hub having an open outer end and an axial supporting member upon which said hub is mounted, of a holding member fixedly mounted on said axial supporting member, a ball bearing mounted in the outer end of said holding member, a cap to close the outer end of said hub, a key operated lock carried by said cap adapted to extend through said bearing, and locking lugs actuated by said lock to engage with the inner race of said ball bearing.

2. The combination with a wheel hub having an open outer end and an axial supporting member upon which said hub is mounted, a head secured on said axial supporting member having a central recess in its outer end, a ball bearing mounted in the recess of said head having its outer race fixed in the recess and its inner race adapted to rotate, a cap to close the open end of said hub, a key operated lock carried by said cap adapted to extend through said bearing and locking lugs actuated by said lock to engage with the inner end of the inner race of said ball bearing.

JOHN T. DUARTE.